Jan. 31, 1950    W. ORVEDAHL    2,495,819
SPIRAL THERMOSTATIC SWITCH
Filed March 11, 1948
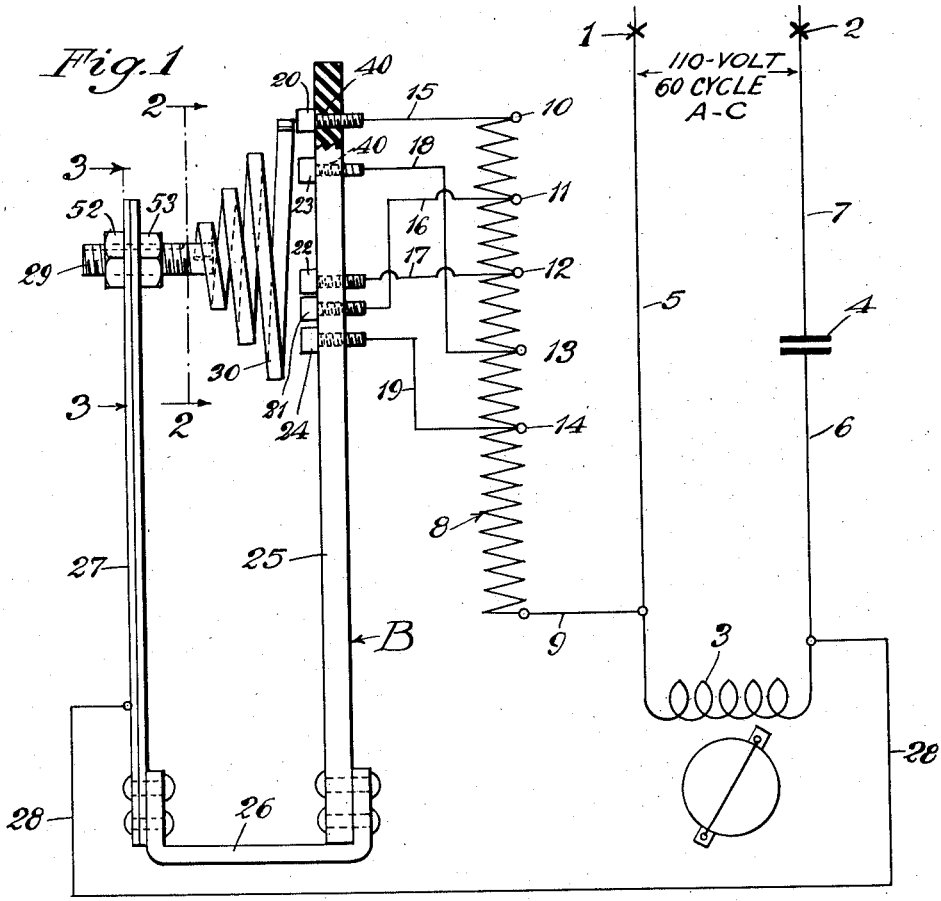
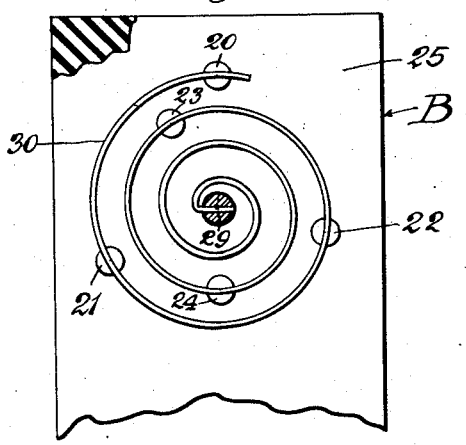
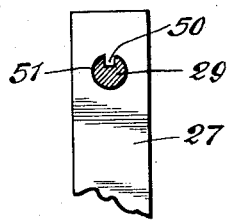
Inventor
Walter Orvedahl
by Parker & Carter
Attorneys Patented Jan. 31, 1950

2,495,819

UNITED STATES PATENT OFFICE 2,495,819

SPIRAL THERMOSTATIC SWITCH

Walter Orvedahl, Santa Fe, N. Mex., assignor to Control Devices, Inc., Santa Fe, N. Mex., a corporation of New Mexico Application March 11, 1948, Serial No. 14,297

3 Claims. (Cl. 200—138)

My invention relates to improvements in thermostats and has for one object to provide a simple, cheap, convenient thermostat which may be used to control the operation of a house heating or other heating installation.

I illustrate my invention as applied to the control of an electric motor which may be used in connection with any suitable type of house heating apparatus, the motor by means forming no part of my present invention controlling the heat generated by the apparatus and heating the areas in which the thermostat is located.

My invention is illustrated more or less diagrammatically in the accompanying drawings, wherein:

Figure 1 is a side elevation of the device;

Figure 2 is a section along the line 2—2 of Figure 1 looking in the direction of the arrows;

Figure 3 is a section along the line 3—3 of Figure 1 looking in the direction of the arrows.

Like parts are indicated by like characters in the drawings.

1, 2 represent the terminals of 110 volts, 60 cycle alternating current supply line. 3 is a motor field coil. 4 is a series condenser. An alternating current circuit is thus established from terminal 1 through conductor 5, motor field coil 3, conductor 6, condenser 4, conductor 7 back to terminal 2.

I propose to control motor operation by placing in parallel with the field coil 3 a variable resistance 8. This variable resistance is connected to the conductor 5 by a conductor 9 and has a plurality of taps 10, 11, 12, 13 and 14. These taps are connected by conductors 15, 16, 17, 18 and 19 respectively to a series of contact buttons 20, 21, 22, 23, 24, all these buttons being supported in insulating panel 25. Projecting forwardly from this insulating panel is a supporting bracket 26 which carries a bi-metal heat sensitive strip 27 rigidly mounted thereon in front of the panel. The conductor 28 extends from the conductor 6 to the bi-metal element 27 thus being in parallel with the motor winding 3.

Carried adjustably on the bi-metal element 27 is a screw 29 which in turn carries a spiral metal strip 30. Plan view in Figure 2 shows the relationship between the spiral contact strip 30 and the contact buttons 20 to 24 inclusive. It will be noted that these contact buttons are arranged in a spiral on the supporting plate B conforming generally to the outer coils of the spiral contact member 30. The spiral member 30 is so spaced and positioned that when pressure is applied to force the contact member against the buttons 20 to 24 inclusive, the spiral collapses gradually, button 20 being first contacted by the spiral then button 21, next 22, 23, 24 in their sequence.

It is necessary, of course, that the metal of the spiral strip 30 be sufficiently elastic and its vertical pitch of the spiral sufficiently low so that the spiral will always recover its original form after having been pressed until all, or at least those turns which engage the buttons, have occupied a common plane.

Assuming that the element 27 is exposed to the ambient temperature of a room in which the thermostat is located, and the room is to be heated by a heater including the motor whose field coil is illustrated in 3 with the parts in the position shown in Figure 1, there is a contact between the coil 30, the contact button 20 so that the entire resistor 8 is in parallel with the field coil 3. Under these circumstances but little, if any, current passes through the resistor, the total resistance being greater than the resistance of the field coil 3.

As the temperature increases, the arm 27 moves to the right until contact button 21 is engaged by the coil at which time part of the resistance is removed from the circuit. Further temperature increase moves the arm 27 further to the right and contact button 22 and so on, puts out additional increment of resistor 8 until contact button 24 is engaged by the spiral element 30, the resistance of the resistor 8 has dropped to a minimum.

Each time the resistance is decreased, more current tends to pass through the resistor and less through the coil 3 so that increased temperature causes the spiral to move toward the contact to decrease resistance although the motor thereby reduces the output of the heater.

It will be noted that decrease in temperature will cause a reverse action but only one of the contact buttons is contacted or disconnected at a time. There is no simultaneous opening or closing of a circuit and so in consistence with the movement of the bi-metal arm as the ambient temperature changes greater or less resistance is inserted in the circuit in parallel with the motor field coil so that as temperature rises motor speed and power decreases, as temperature falls motor speed and power increases.

The contact members 20 to 24 inclusive are threaded in the insulating block 25 as indicated at 40 in order that the extension of the contact members toward the base of the strip may be adjusted to insure that as the strip is pressed toward the contact members, each contact member will be brought successively into engagement with the conductor strip starting at contact 20 and going around successively to contact 24.

Figure 3 indicates that the threaded member 29 is longitudinally slotted to be engaged by a key 50 in the aperture 51 in the thermostatic element 27, adjusting nuts 52 and 53 threaded on the member 29 may be manipulated in the usual manner to move conical spiral strip toward and from the contact members independent of the position of the thermostatic element or plate 27. This adjustment is, of course, essential in setting the annular start and end point of the cycle, but it is essential also that such adjustment impart no rotational or angular movement of the spiral with respect to the electric contact members, as otherwise the members might be moved out of register with that part of the strip which it is intended they will contact.

For convenience I have shown the conical strip mounted on the bi-metal thermostat element. Obviously the member 25 might be the movable member and 27 might be fixed, or both might be movable, or other temperature responsive means might be used to change the relative position of the coil and the associated contact members.

I claim:

1. In combination, a temperature responsive thermostatic element, a metal conductor strip wound to form a conical spiral, and supported at its apex on the thermostatic element, a series of insulated electrical contact members, spirally arranged, in register with the convolutions of the strip, adjacent the base thereof, and so positioned that as the strip is moved by the thermostatic element toward the contact members the strip collapses axially to contact successive contact members.

2. In combination, a temperature responsive thermostatic element, a metal conductor strip wound to form a conical spiral, and supported at its apex on the thermostatic element, a series of insulated electrical contact members, spirally arranged, in register with the convolutions of the strip, adjacent the base thereof, and so positioned that as the strip is moved by the thermostatic element toward the contact members the strip collapses axially to contact successive contact members, means for adjusting the strip with respect to thermostatic element toward and from the contact members.

3. In combination, a temperature responsive thermostatic element, a metal conductor strip wound to form a conical spiral, and supported at its apex on the thermostatic element, a series of insulated electrical contact members, spirally arranged, in register with the convolutions of the strip, adjacent the base thereof, and so positioned that as the strip is moved by the thermostatic element toward the contact members the strip collapses axially to contact successive contact members, and means for preventing angular movement of the conductor strip about the axis of the conical spiral.

WALTER ORVEDAHL.

REFERENCES CITED

The following references are of record in the file of this patent:

UNITED STATES PATENTS

| Number | Name | Date |
| --- | --- | --- |
| 488,121 | Houghton et al. | Dec. 13, 1892 |
| 1,052,816 | Hadaway | Feb. 11, 1913 |
| 2,023,544 | Pierson | Dec. 10, 1935 |
| 2,383,533 | Crise | Aug. 28, 1945 |